No. 874,460. PATENTED DEC. 24, 1907.
C. H. VESSOT.
FLAX PULLING MACHINE.
APPLICATION FILED DEC. 29, 1905.
2 SHEETS—SHEET 1.
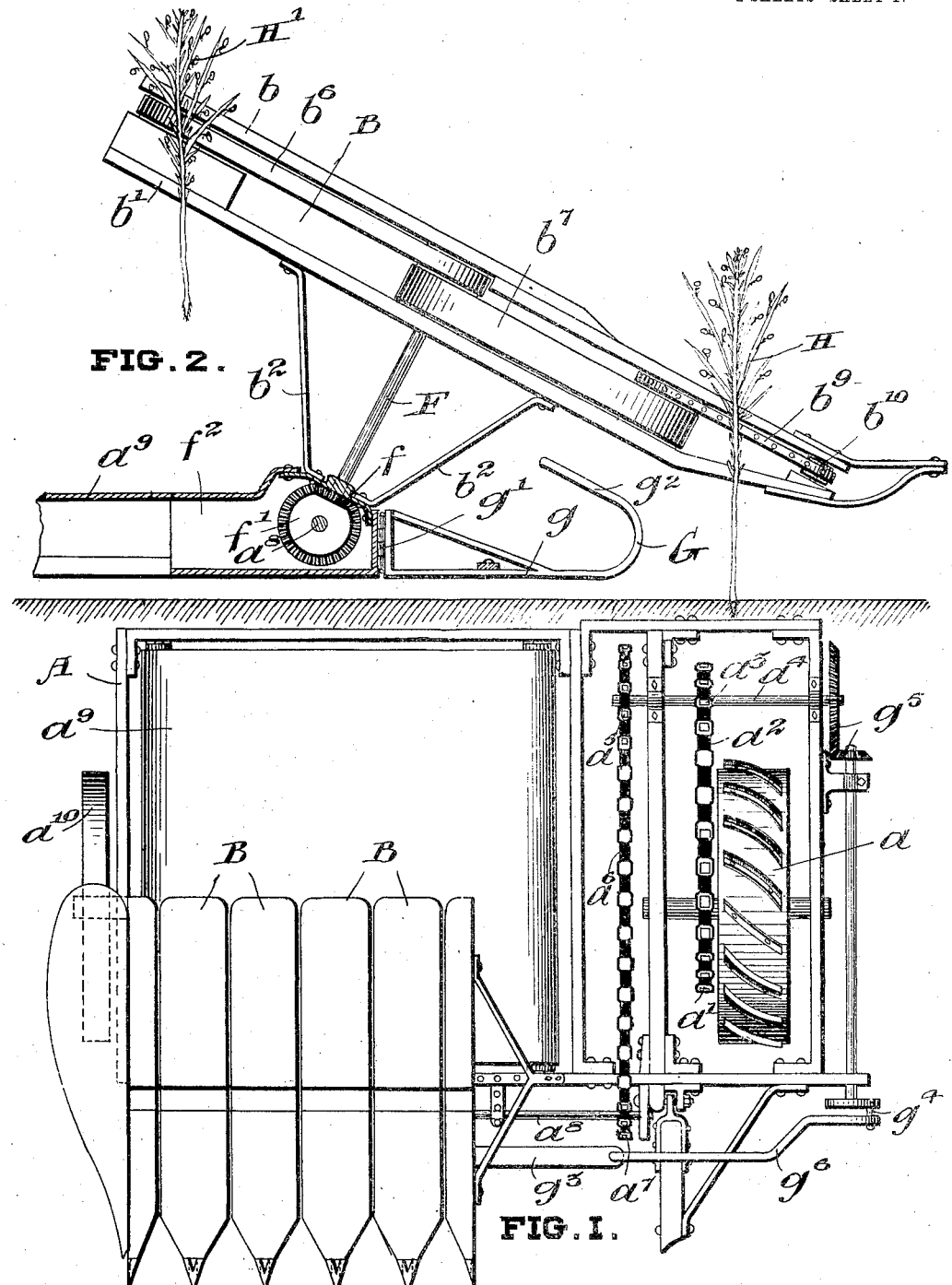
WITNESSES
INVENTOR
C. H. VESSOT

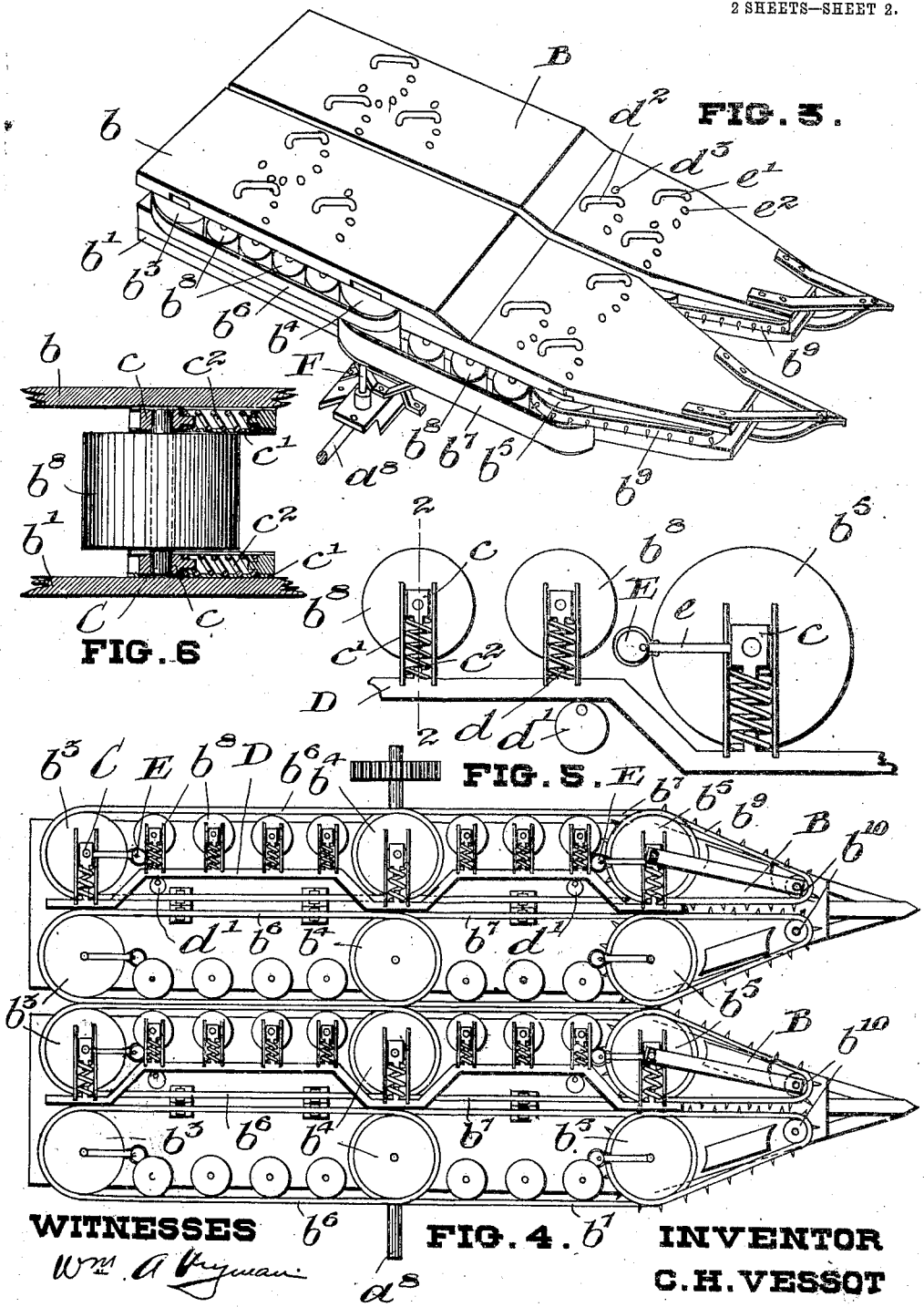

UNITED STATES PATENT OFFICE.

CHARLES HENRI VESSOT, OF OTTAWA, ONTARIO, CANADA.

FLAX-PULLING MACHINE.

No. 874,460.　　　　　Specification of Letters Patent.　　　　　Patented Dec. 24, 1907.

Application filed December 29, 1905. Serial No. 293,866.

*To all whom it may concern:*

Be it known that I, CHARLES HENRI VESSOT, of the city of Ottawa, in the county of Carleton, Province of Ontario, Canada, have invented certain new and useful Improvements in Flax-Pulling Machines, of which the following is a specification.

My invention relates to improvements in flax pulling machines and the objects of my invention are to provide a machine which will harvest the flax by pulling the same up by the root and thus do away with the necessity of hand labor hitherto employed for this purpose, further objects being to render the device of simple and cheap construction and such that it may be readily applied to any of the existing forms of binders or other farming machinery; and it consists essentially of a transversely disposed series of pairs of abutting flax pulling belts inclined at an angle to the horizontal and supported in such a manner that when the machine is advanced against a flax crop the flax will be gripped under the seeds between the two belts and uprooted by the movement thereof, means being also provided to hold the belts in resilient contact and to communicate the motion of the driving wheel to the belts, the various parts of the device being constructed and arranged in detail as hereinafter more particularly described.

Figure 1 is a plan view of my flax pulling machine. Fig. 2 is an enlarged side elevation of one of the flax pulling mechanisms. Fig. 3 shows a perspective view of a pair of these flax pulling devices. Fig. 4 is a plan view of the same with the upper covering removed. Fig. 5 is an enlarged detail showing means for providing resilient contact between the belts. Fig. 6 is a section view on the line 2—2 Fig. 5.

In the drawings like letters of reference indicate corresponding parts in each figure.

In flax harvesting when it is desired to save the fiber for linen it has been hitherto necessary to gather the same by hand for the reason that in the ordinary form of mowing or harvesting machine considerable length of the fiber is lost at the bottom due to the cutting taking place at a considerable distance above the root and furthermore there is a great liability to break or otherwise injure the fiber. In my improved flax pulling machine however, I provide means which pull the flax in exactly the same manner as is done by hand, the flax being pulled by a direct upward movement. It is evident that a device of this class will accelerate greatly the speed with which the flax may be harvested and will hence enable the same to be accomplished at a considerably reduced cost.

Referring to the drawings A is the frame of my machine which may be similar to that of an ordinary mowing or binding machine and in fact I may make my flax puller of such construction that it may be directly applied to an ordinary mowing or binding machine to take the place of the cutting knives thereon. The frame A is supported by the usual main driving wheel $a$ to the shaft of which a sprocket wheel $a'$ is secured which is connected by a chain $a^2$ to a second sprocket wheel $a^3$ on a shaft $a^4$. This shaft has another sprocket wheel $a^5$ connected by means of a chain $a^6$ to a sprocket wheel $a^7$ on a shaft $a^8$ which operates my flax pulling device in a manner hereinafter described. $a^9$ is the usual lateral extending grain receiving platform or belt partially supported by a wheel $a^{10}$ running on the ground.

B are the casings for my flax pulling devices comprising upper and lower members $b$ $b'$ separated by suitable blocks and which are supported in position by braces $b^2$ or other suitable means at an angle of about thirty-five degrees to the horizontal. A plurality of these casings are provided which are placed side by side and extend transversely of the machine. On each side of the casing a plurality of pulleys are mounted with a portion of their periphery protruding beyond the edge of the casing. In the form shown I provide three main pulleys $b^3$ $b^4$ and $b^5$ around which belts $b^6$ and $b^7$ run, the pulley $b^4$ engaging both belts. Between the main pulleys I provide a plurality of smaller pulleys or rollers $b^8$ which are adapted to press against the belting as shown. I also provide a small outer flax engaging belt $b^9$ provided with a plurality of outwardly protruding spikes and which is supported on the pulley $b^5$ and a small auxiliary pulley $b^{10}$.

While I have described one particular form of arranging the belting yet this may be accomplished in any other suitable form, the main essential being that the line of belting shall be continuous from one end of the casing to the other. When the several casings B are brought alongside of each other the outwardly protruding parts of the belts in each will abut each other and the flax coming between is adapted to be gripped by them as hereinafter described.

To assist in keeping the belts in opposite casings in contact on one side of each casing I provide resiliently held bearing blocks C for each of the pulleys or rollers along one side. The construction of these bearing blocks may be of any desired form, that I prefer comprising bearing blocks $c$ $c$ inclosing the pintles of the pulley and which are slidably held in a casing $c'$, a compression spring $c^2$ normally resiliently holding the blocks in their outermost position. Provision is also made in the casing for a slight longitudinal movement of the end pulleys for a purpose hereinafter described. It will thus be seen that the belts in one casing having resiliently supported pulleys will always remain in resilient contact with the belt on the opposite casing. To further assist in the adjustment of the belts I provide means for increasing or decreasing the amount of the spring pressure between them. These means comprise a longitudinal bar D of the form shown which has projecting lugs $d$ formed integral thereto opposite each pulley and which is adapted to be inclosed by the compression spring holding the bearing block of the pulley in position. This bar is controlled in its lateral movement by means of a plurality of cams or eccentrics $d'$ suitably mounted in the casing and which are operated by means of small levers $d^2$ on the top of the casing the ends of which engage notches $d^3$ provided in the top of the casing whereby the lever will remain in any position to which it has been adjusted. It will thus be seen that by means of the bar D and the cams operating the same the tension in the compression springs $c'$ may be increased or decreased at pleasure.

To insure that the belts may be always taut I provide cams E at each end of the casing which engage rods $e$ which abut the bearing blocks of the end pulleys whereby when the cams or eccentrics are rotated the bearing blocks will be moved outwardly or inwardly and the belts correspondingly tightened or loosened. I also provide operating levers $e'$ for these cams on the top of the casing wherein are provided notches $e^2$ which the end of the lever is adapted to engage and be held thereby in any position to which it has been adjusted.

The belts $b^6$ $b^7$ and $b^9$ are all operated from the main driving pulley $b^4$ which in the embodiment shown is operated by a shaft F connected by a beveled gear $f$ to a similar gear $f'$ provided on the transverse driving shaft $a^3$ which as hereinbefore described is connected by the system of gearing to the main driving wheel of the machine. The gearing is so arranged that the belting on opposite sides of the casing will rotate in opposite directions.

To disengage any mud or dirt which may sometimes cling to the roots of the flax plant I provide mud shakers G between each contacting pair of belts. In the form shown these mud shakers simply comprise arms $g$ hinged to the casing $f^2$ at $g'$ and having upwardly and inwardly curved portions $g^2$ which are adapted to come in contact with the roots of the flax plant. These mud shakers are all connected together by means of a rod $g^3$ and an oscillating motion is imparted thereto by means of a crank $g^4$ connected by suitable beveled gearing $g^5$ to the shaft $a^4$ and which is connected to the rod $g^3$ by a suitable connecting rod $g^6$.

The operation of my device is as follows: The upper part of the flax plant H coming in contact with the abutting rotating belts is gripped between them and these being inclined at an angle of thirty-five degrees and continuously rotating gradually lift the plant out of the ground carrying the roots therewith until finally it reaches the position H'. From here it will drop on to the platform $a^9$ from which it may afterwards be collected.

Of course it will be understood that the regular binding mechanism may be employed in connection with the platform $a^9$ which in this case would be in the form of a rotating canvas belt. The roots of the flax as it is being moved upwards by the belt will contact with the mud shaker G and any mud or dirt which may have clung thereto will be removed. The belts $b^6$ provided with the spikes afford very efficient means for bringing the flax into engagement with the abutting belts. I might here mention that it would be possible to construct my flax puller with a plurality of abutting small rollers without belts but I have found the belts to work much more satisfactorily. It will thus be seen that when my machine is advanced against a flax crop the same will be harvested in exactly the same manner as at present employed by hand labor and all the beneficial results of the latter will remain.

While I have described with great particularity of detail one embodiment of my invention yet it is not to be understood therefrom that my invention is limited to the specific construction shown as it is of such a nature that the details will have to be greatly varied accordingly as it is applied to different forms of binders, the essential principle of the invention, however, remaining the same in each case.

What I claim as my invention is:—

1. In a device of the class described the combination with two abutting flax pulling belts, of means for rotating the same and a means for shaking the mud from the roots of the flax suitably placed below said belts as and for the purpose specified.

2. In a device of the class described the combination with a suitable upper and lower covering of a plurality of rollers, slidably supported bearing blocks for the same, compression springs normally holding said bearing blocks in their outermost position, a rod abutting the opposite ends of the springs of all the bearing blocks on one side of the casing, and cam means for moving said rod to compress said springs as and for the purpose specified.

3. In a device of the class described the combination with the flax pulling belts of a mud shaker located below the flax pulling belts comprising an oscillating arm provided with an upwardly extending portion and means for oscillating said arm as and for the purpose specified.

4. In a device of the class described the combination with a plurality of pulling and carrying means of a plurality of mud shakers located below the same, comprising pivoted arms provided with upwardly extending portions, a rod connecting all of said arms and means for communicating a reciprocating movement to said rod as and for the purpose specified.

5. In a flax pulling machine the combination with two central driving pulleys and means for rotating the same of contacting flax pulling belts extending partially around the pulleys and forwardly and downwardly at an angle to the horizontal and contacting carrying belts also extending around the central pulleys and rearwardly therefrom and adapted to carry the flax after it has been pulled by the first belts, and engaging belts extending forward from the front ends of the pulling belts and horizontal carrying belts transversely extending beneath the rear ends of the pulling belts. as and for the purpose specified.

Signed at Ottawa, in the county of Carleton, Province of Ontario, this 18th day of December, 1905.

CHARLES HENRI VESSOT.

Witnesses:
RUSSELL S. SMART,
WM. A. WYMAN.